Dec. 21, 1954
L. PARKIN
2,697,259
CLIP TYPE PANEL FASTENER
Filed Oct. 5, 1951
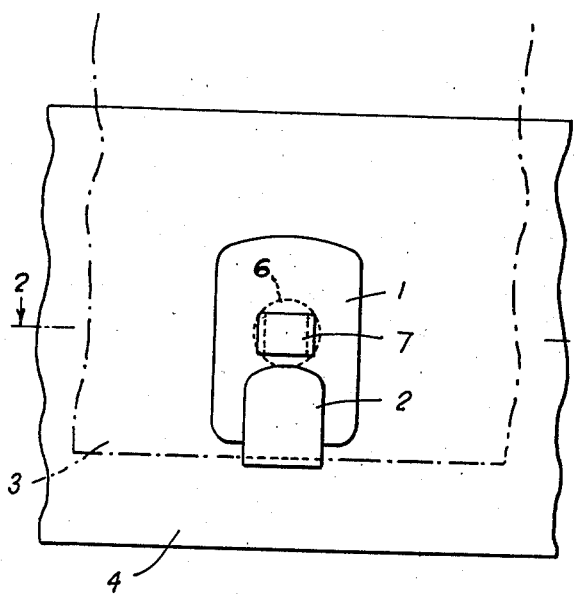
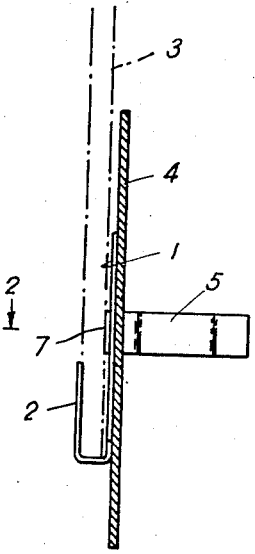
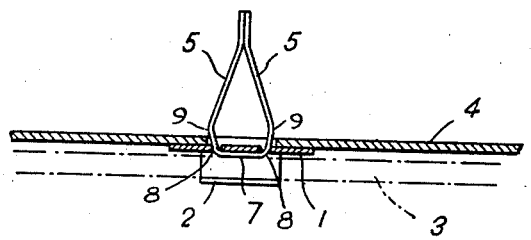
INVENTOR:
LESLIE PARKIN,
BY Philip E. Parker
ATTORNEY.

United States Patent Office 2,697,259
Patented Dec. 21, 1954

2,697,259

CLIP TYPE PANEL FASTENER

Leslie Parkin, Hyson Green, Nottingham, England, assignor to United-Carr Fastener Corporation, Cambridge, Mass., a corporation of Massachusetts Application October 5, 1951, Serial No. 249,899

Claims priority, application Great Britain October 13, 1950

1 Claim. (Cl. 24—73)

This invention relates to fasteners for securing a panel or other article to an apertured support to secure a panel thereto.

In securing panels or the like to structures such as parts of the body of a motor vehicle moisture and dust are liable to enter through the apertures in the parts to which the panel securing clip is secured and it is an object of this invention to provide a fastener clip which will prevent this.

According to the present invention a fastener for securing a panel or other article to an apertured support, comprises a substantially flat base plate provided with snap fastener means disposed inwardly of the peripheral edges of said plate and extending substantially normal thereto for engagement in an aperture in a support, one side edge of the base plate having an extension bent to overlap the base plate on the face opposite to the snap fastener means and adapted to co-operate with said base plate to form a pocket to receive a panel or other article to be secured.

To enable the invention to be fully understood it will now be described with reference to the accompanying drawing in which:

Fig. 1 is a plan view of a fastener according to one embodiment of the invention assembled on an apertured support.

Fig. 2 is a section on line 2—2 of Fig. 1 and

Fig. 3 is a side view of Fig. 1.

As shown in the accompanying drawing the fastener comprises a flat sheet metal base plate 1 of rectangular shape having an extension 2 at one edge which is bent to overlap the base plate 1 and form a resilient wall of a pocket to receive an edge of a panel or like part 3 to be secured to a support 4.

The fastener is adapted to be attached to the support 4 by snap fastener means comprising opposed resilient, spring fingers 5 adapted to be snapped through an aperture 6 in the support 4. As shown, the snap fastener means comprise a strip of spring steel bent to provide a base portion 7 resting on one face of the base plate 1, and integral fingers 5 extending through spaced slots 8 so as to project substantially normal to the plane of the base plate on the opposite side to the extension 2.

The fingers 5 converge towards one another and abut in overlapping relation at the outer ends, and shoulders 9 are provided which abut the edges of the aperture 6 in the support 4 to secure the fastener firmly thereto.

It will be noted that the fingers 5 are located inwardly of the peripheral edges of the base plate 1 which is of such dimensions that it overlaps the whole of the aperture 6 in the support and seals it against the entry of dust or moisture. The slots 8 in the base plate are preferably of such size that the fingers 5 make a close fit therein so as to prevent the entry of dust or moisture through the slots.

If desired the spring fingers 5 or like snap fastener means may be spot welded to the base plate 1.

To assemble the fastener, the fingers 5 are inserted into the aperture 6 of the support and pressure is applied to the plate 1 to snap them home so that the base plate 1 overlies and completely covers the aperture 6. A part such as a panel 3, is then positioned so that edge portions enter the pocket formed by the tension 2 and base plate 1. The extension 2 being resilient, serves to grip the panel 3 by spring tension.

It will be understood that any convenient number of fasteners may be provided at spaced points round the support 4 for securing the panel 3 firmly to the support 4.

The fasteners may be adapted for securing trim panels to the door or other part of the body of a motor vehicle but are not limited to this particular use.

I claim:

A fastener for securing a panel or other article to an apertured support comprising a substantially flat base plate, fastener means extending integrally from one face of said plate for attachment to a part to be supported and a separate snap fastener stud member disposed inwardly of the peripheral edges of said plate and extending substantially normal to an opposite face of said base plate for engagement in an aperture in a support, said base plate having edge portions defining substantially parallel slot-like apertures, said snap fastener stud member being formed from strip material and having a central portion disposed overlying said one face of the base plate intermediate said slot-like apertures, opposed diverging portions extending from opposite ends of said central portion through said apertures in said base plate in sealing engagement with the opposite outside edge portions of said apertures, thereby securing said stud member to said plate and substantially sealing said apertures, said opposed diverging portions providing shoulders spaced from said opposite face for co-operating therewith in engaging opposite surfaces of a supporting panel, and opposed converging portions extending from said diverging portions and abutting at their free ends in overlapping relation, said converging and diverging portions and said base plate cooperating to provide snap fastener means for snap fastener engagement in an apertured support.

References Cited in the file of this patent

UNITED STATES PATENTS

| Number | Name | Date |
|---|---|---|
| 1,966,041 | Nelson | July 10, 1934 |
| 2,207,374 | Fernberg | July 9, 1940 |
| 2,222,147 | Kral | Nov. 19, 1940 |
| 2,251,991 | Fellner | Aug. 12, 1941 |

FOREIGN PATENTS

| Number | Country | Date |
|---|---|---|
| 964,419 | France | Jan. 25, 1950 |